INVENTOR.
JOHN LOPEZ
BY
Dean, Fairbank & Hirsch
ATTORNEYS

Nov. 28, 1967  J. LOPEZ  3,354,796
SQUARING EQUIPMENT FOR FOLDED BOX BLANKS
Filed Oct. 30, 1964  8 Sheets-Sheet 4

INVENTOR
JOHN LOPEZ
BY
Dean, Fairbank & Hirsch
ATTORNEYS

Nov. 28, 1967   J. LOPEZ   3,354,796
SQUARING EQUIPMENT FOR FOLDED BOX BLANKS
Filed Oct. 30, 1964   8 Sheets-Sheet 6

INVENTOR
JOHN LOPEZ
BY
Dean, Fairbank & Hirsch
ATTORNEYS

Nov. 28, 1967 J. LOPEZ 3,354,796
SQUARING EQUIPMENT FOR FOLDED BOX BLANKS
Filed Oct. 30, 1964 8 Sheets-Sheet 8

INVENTOR
JOHN LOPEZ
BY
Dean, Fairbank & Hirsch
ATTORNEYS

United States Patent Office 3,354,796
Patented Nov. 28, 1967

3,354,796
SQUARING EQUIPMENT FOR FOLDED
BOX BLANKS
John Lopez, Westfield, N.J., assignor to Universal Corrugated Box Machinery Corporation, Linden, N.J., a corporation of New Jersey
Filed Oct. 30, 1964, Ser. No. 407,927
13 Claims. (Cl. 93—36)

ABSTRACT OF THE DISCLOSURE

This invention relates to the art of squaring equipment for folded boxes of the type that comprise four panels in side by side relation that have been pre-scored to facilitate folding of the two outer panels into substantially edge to edge juxtaposition, said squaring equipment having an alignment member in the path of movement of the folded box and a pusher member movable against the trailing edge of the folded box to square the latter.

---

As conducive to an understanding of the invention, it is noted that during the normal automatic folding of corrugated box blanks by belt folders of the type shown in U.S. Patent No. 3,122,069, issued Feb. 25, 1964, since the folding belts of the folder are spiralled 180 degrees to effect corresponding progressive folding of the outer panels of the blanks, the outer panels will be in the spiral portion of the folding belts while the other panels will be advanced by the horizontal conveyor associated with the folding belts.

Since the outer panels will take a longer time to reach the outlet of the folding equipment than the other panels moved by the horizontal conveyer, due to the delay imparted by the spiral portion of the folding belts, it is apparent that the outer panels may not be aligned with the other panels.

As a result of such lack of alignment, the resultant box will not be square and hence cannot be opened properly for filling, without breaking of the corners of the box so that such improperly formed box must be discarded with resultant waste.

Furthermore, when the folded box blanks are opened by automatic equipment, if they are not truly square, such automatic equipment will not function properly.

It is accordingly among the objects of the invention to provide a squaring equipment which will dependably advance folded box blanks in sequence at a relatively high rate of speed and will automatically align the panels of the folded box blank, thereby providing a folded box that is square and which may be opened without breakage of the corners thereof.

According to the invention, a conveyer is provided which successively advances folded box blanks in sequence and means are provided as the blanks are advanced to force the leading and trailing edges of successive folded box blanks between alignment members which will effect squaring of such box blank.

More particularly, the alignment member engaging the trailing edge of the box blank forces the leading edge thereof against an alignment member which will move out of the path of such box blank after it has been squared to permit discharge of the box blank to subsequent processing equipment such as a taping machine that applies a length of tape to adjacent edge portions of the folded panels.

In a preferred embodiment of the invention, means are provided to retain the folded panels in squared position immediately prior to movement of the alignment member engaged by the leading edge of the folded box blank, out of the path of movement of the latter, in order to retain such folded box blank in square condition as it moves past the displaced forward alignment bar.

This application is a continuation-in-part of co-pending applications Ser. No. 360,618, filed April 17, 1964, now Patent No. 3,324,773 and Ser. No. 360,602, filed April 17, 1964, now Patent No. 3,326,095.

In the accompanying drawings in which is shown one or more of various possible embodiments of the several features of the invention.

Figures 1, 2:
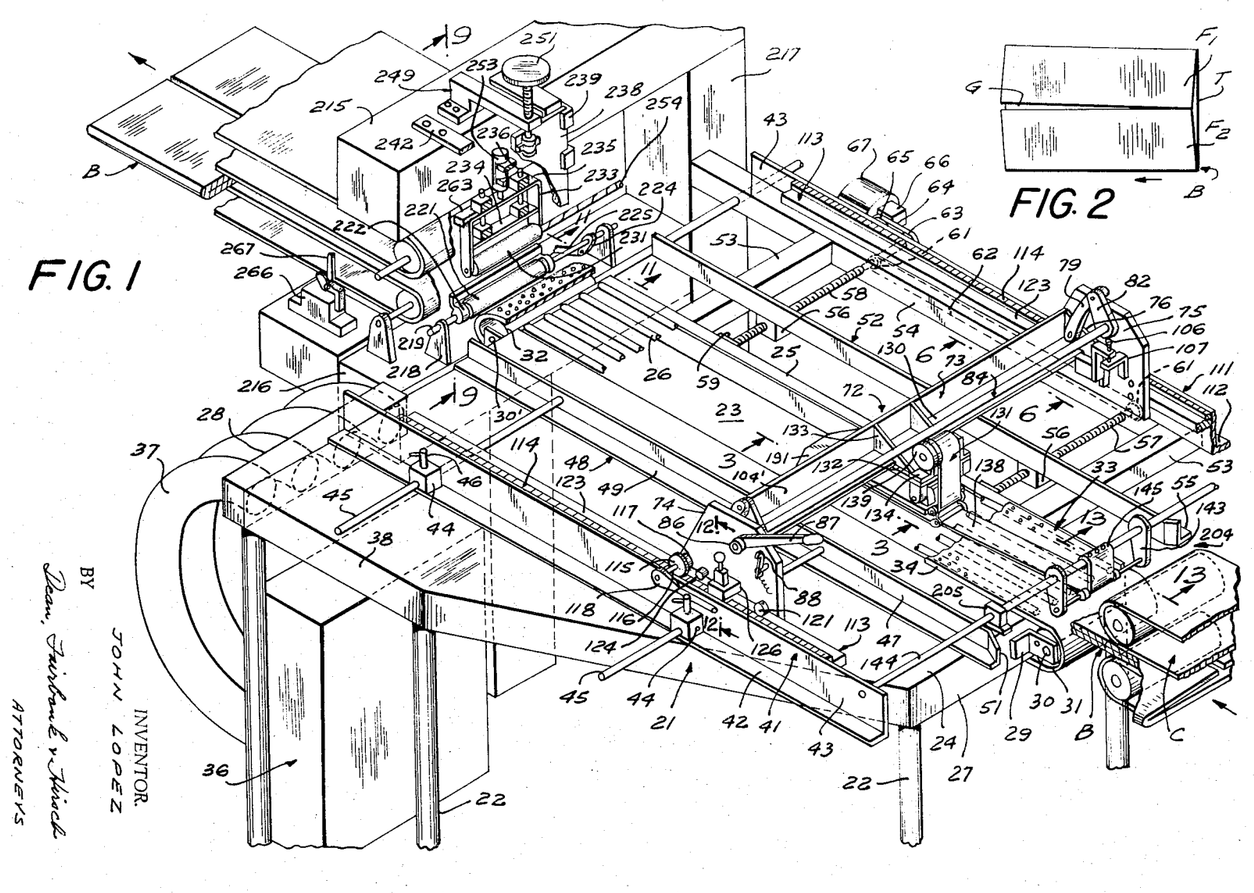
FIG. 1 is a perspective view of the squaring equipment with parts broken away.
FIG. 2 is a plan view of a typical folded box blank before it is squared.

Referring now to the drawings, as shown in FIG. 1, the equipment comprises a hollow casing 21 which is supported in a horizontal plane by suitable standards 22. The casing 21 has an elongated rectangular opening 23 in its top wall 24 adjacent the side wall 25 thereof and a plurality of spaced parallel support rods 26 extend the length of said opening.

Extending outwardly from the ends 27, 28 of the casing adjacent side edge 25 thereof and aligned with said openings 23 (FIG. 1) are a pair of spaced parallel brackets 29, each pair of which mounts a pulley 31, 32 on an associated shaft 30, 30'. A perforated conveyor belt 33 encompasses said pulleys 31, 32 as well as the portion of said casing 21 having said opening 23, so that the upper run 34 of said conveyer belt extends over said opening 23 supported by the parallel support rods 26 as is clearly shown in FIG. 1.

The interior of said casing 21 defines a suction chamber 35 and a conventional suction blower 36 is provided driven in any suitable manner and having its suction lines 37 connected to the end wall 28 of the casing as shown in FIG. 1 adjacent the side wall 38 thereof.

Means are provided to guide a box blank B positioned on the conveyer belt 33.

To this end, as shown in FIG. 1, an L-shaped angle beam 41 is provided having its horizontal leg 42 secured as by welding to the top wall 24 of the casing 21 on the side of opening 23 adjacent the wall 38 thereof and extending parallel to the adjacent edge of elongated opening 23.

Secured to the vertical leg 43 of the beam 41 and spaced along the length thereof are blocks 44, each of which has a horizontal bore through which extends an associated rod 45, the position of said rods being set by means of a set screw 46 extending vertically through each block.

The free inner end of each of the rods 45 is secured to the vertical wall 47 of an L-shaped angle bar 48, the horizontal leg 49 of which rests on the top wall 24 and is directed outwardly toward angle beam 41.

As shown in FIG. 1, the vertical leg 47 of angle bar 48 presents a guide surface and the outer end thereof is flared outwardly as shown at 51.

Thus, the angle bar 49 and the associated support therefor serves as one side of the guide means for the box blanks B.

The other side of the guide means comprises an L-shaped angle bar 52 similar to angle bar 48 and which in conjunction therewith serves to form the guide channel for the box blanks B.

The angle bar 52 is mounted so that it may automatically be moved toward and away from angle bar 48 to adjust the spacing therebetween, depending upon the width of the box blank B to be accommodated.

To this end, as is shown in FIG. 1, a pair of spaced parallel support bars 53 are secured at one end as by welding to the side wall 25 of the casing 21 and extend outwardly therefrom, the outer ends of bars 53 being joined by a bar 54 which extends parallel to side wall 25.

The horizontal leg 55 of angle bar 52 mounts a pair of blocks 56 on the undersurface thereof and spaced along the length thereof, each of said blocks having a horizontal threaded bore through which extends an associated threaded rod or screw 57, 58.

One end of each screw 57, 58 is rotatably mounted in a suitable bearing 59 secured to side wall 25. The other end of each screw is rotatably mounted in a suitable bearing carried by the bar 54 and each of said outer ends mounts a sprocket wheel 61 connected by a sprocket chain 62.

The screw 58 also mounts a pulley 63 at its outer end which is connected by a belt 64 for example, to a pulley 65 driven through gear box 66 by a reversible motor 67 mounted on bar 54.

Thus, depending upon the direction of rotation of motor 67, the screws can be rotated in a corresponding direction to cause the angle bar 52 to move toward and away from angle bar 48 to adjust the spacing therebetween.

Figure 6:
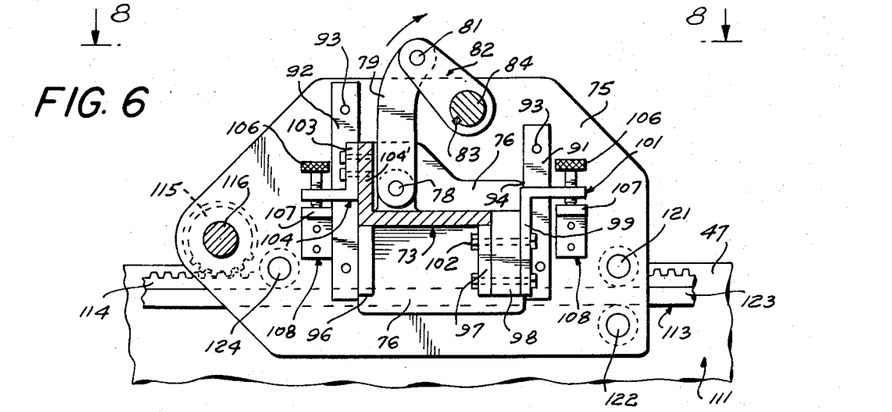
FIG. 6 is a view taken along lne 6—6 of FIG. 1, showing the mount for the squaring unit, on a larger scale, with the mount in its lower position.
Figure 7:
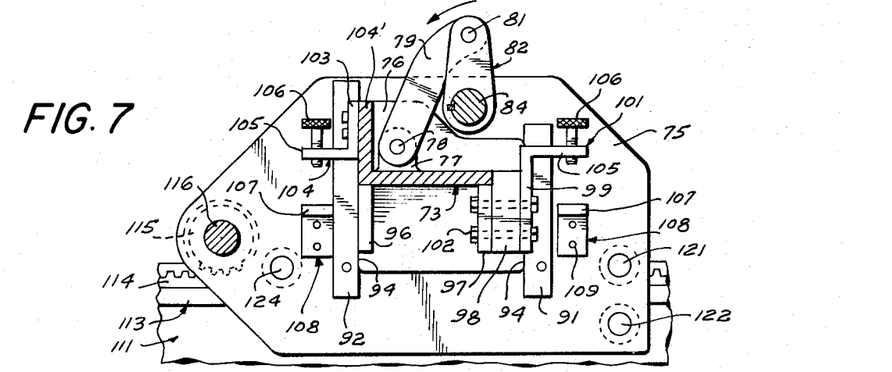
FIG. 7 is a view similar to FIG. 6 with the mount in its upper position.
Figure 8:
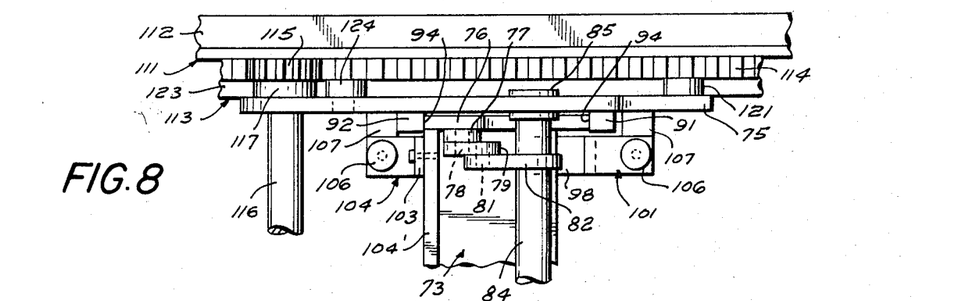
FIG. 8 is a plan view taken along line 8—8 of FIG. 6.

Associated with the casing 21 is a movable mount or carriage 72 (FIG. 1) which comprises an L-beam 73 extending transversely across the conveyor belt 33 and supported at its ends on upstanding parallel plates 74, 75 (FIGS. 6–8).

Each end of the L-beam 73 has a wall 76 secured thereto and extending in a plane at right angles to the length of the beam 73. Secured to the inner surface of each wall 76 is a block 77 to which is pivotally mounted as at 78 one end of a curved link 79, the other end of which is pivotally connected as at 81 to an associated lever arm 82, keyed as at 83 to a torsion rod 84 which extends through said lever arms 82 and through the plates 74, 75, being rotatably mounted in suitable bearings 85 secured to the outer surface of each of said plates.

The end 86 (FIG. 1) of rod 84 extending through the bearing 85 mounted on plate 74 has secured thereto one end of an actuating handle 87 which may be releasably latched in actuated position by a spring urged hook 88.

With the construction above described, referring to FIGS. 1, 6–8, when the actuating handle 87 is moved in a clockwise direction from the position shown in FIG. 1, the rod 84 will rotate in a corresponding direction, and through the linkage comprising lever arms 82 and links 79, will lift the L-beam 73 from the position shown in FIG. 6, to the position shown in FIG. 7 to provide access to the conveyer belt 33.

As the handle 87 moves past the spring urged hook 88, the latter will first be moved inwardly to permit passage of the free end of handle 87 and then will snap outwardly to engage the handle, releasably to retain the L-beam 73 in its uppermost position as shown in FIG. 7.

Means are provided to guide the L-beam 73 vertically as it is moved by the actuating handle 87. To this end a pair of rectangular guide bars 91, 92 (FIGS. 6–8) are secured by bolts 93 to the inner surface of each of the plates 74, 75 to define spaced parallel vertical tracks, the vertical side edges 94 of the end walls 76 being straddled by said guide bars.

In order adjustably to limit the downward movement of the L-beam, as shown in FIGS. 6–8, a pair of parallel reinforcing struts 96, 97 are secured as by welding to the undersurface of the L-beam at each end thereof and to the associated end wall 76. Positioned against the outer surface of each of the struts 97 is a block 98 and the vertical leg 99 of an L-bracket 101 is secured as by bolts 102 to the struts 97, the bolts also extending through block 98. Similarly, the vertical leg 103 of an L-bracket 104 is secured to the vertical leg 104' of L-beam 73.

The outwardly extending horizontal leg 105 of each bracket 101, 104 mounts a rotatable adjustment screw 106 which is designed to abut against the horizontal leg 107 of an associated L-bracket 108 secured as by bolts 109 to the plates 74, 75.

Thus by adjustment of any one of the screws 106 due to the linkage 79, 82 to rod 84, the downward movement of the L-beam 73 is uniformly limited.

Means are provided to afford longitudinal movement of the L-beam 73 toward and away from the outlet 110 (FIG. 9) of the squaring equipment.

To this end as shown in FIG. 1, in addition to the L-shaped beam 41 (left side of FIG. 1) which carries the side gauge 48 a second L-shaped beam 111 (right side of FIG. 1) is provided, the horizontal leg 112 of which is secured to the top surface of side beam 54.

Each of the vertical legs 43 of beams 41, 111 has secured to the inner surface thereof a flat bar 113 which extends substantially the length of the associated L-beam 41, 111. The inner portion of bar 113 adjacent the vertical leg 43 of the associated L-beam is conformed as an elongated rack 114 which is engaged by an associated pinion 115 secured at each end of a rod 116 which extends transversely across the conveyer belt, through suitable bearings 117 mounted on each of the end plates 74, 75 (FIG. 8).

As shown in FIG. 1, the rod 116 extends through the associated pinion 115 and mounts a reversible ratchet bar 118 for manual rotation of rod 116 and pinions 115 thereon to move the carriage 72 in the desired direction.

To support the carriage, each of the plates 74, 75 at the side edge thereof remote from the edge mounting the pinion 115, has a pair of vertically spaced rollers 121, 122 thereon which straddle the inner portion 123 of bars 113 as shown in FIGS. 6 and 7.

An additional roller 124 carried by each of the plates 74, 75 also rides on the top surface of the inner portion 123 of the bars 113.

Figure 12:
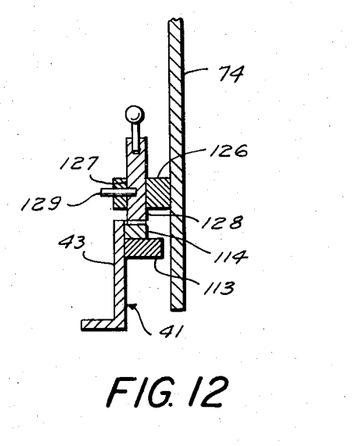
FIG. 12 is a detail sectional view on an enlarged scale showing the locking mechanism for the squaring unit mount, and taken along line 12—12 of FIG. 1.

In order to lock the carriage 72 in adjusted position, referring to FIGS. 1 and 12, the plate 74 has an outwardly extending block 126 with a vertical rectangular slot 127 to receive a rectangular detent 128, the lower edge of which has teeth that engages the teeth on the rack bar 114 to lock the carriage in set position, a locking pin 129 preventing inadvertent release of detent 127.

The carriage 72 carries the squaring unit 131 which, as shown in FIGS. 1, 3–5, comprises a substantially rectangular mounting plate 132 secured as by welding to the undersurface of the horizontal leg 130 of L-beam 73 and externally at right angles thereto, said plate extending beyond the front and rear edges of said beam 73.

Figure 4:
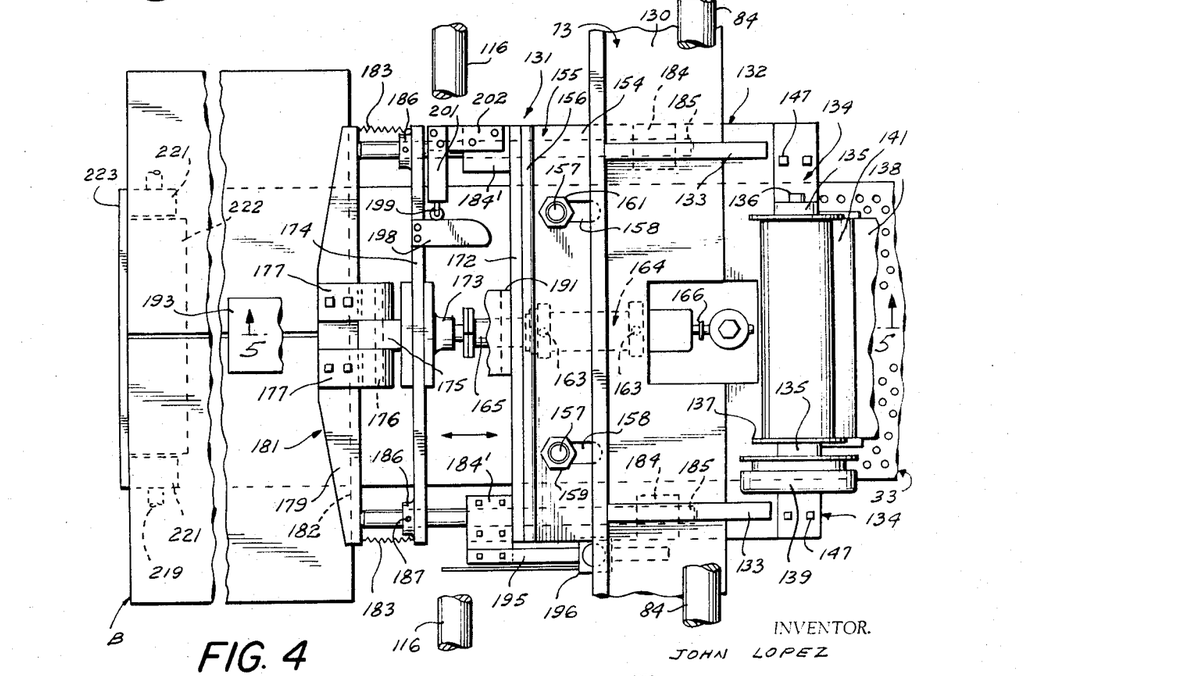
FIG. 4 is a plan view taken along line 4—4 of FIG. 3.

To reinforce the supporting plate 132, a pair of spaced parallel struts 133 are provided, secured as by welding to the L-beam and to the top surface of plate 132 adjacent the side edges of the latter as shown in FIG. 4.

Positioned on the end of supporting plate 132 and rising therefrom are L-shaped brackets 134 between the vertical legs 135 of which a shaft 136 is mounted. The shaft 136 carries a reel 137 on which a belt 138 is wound, the belt being maintained under tension by a spring mechanism 139.

Figure 3:
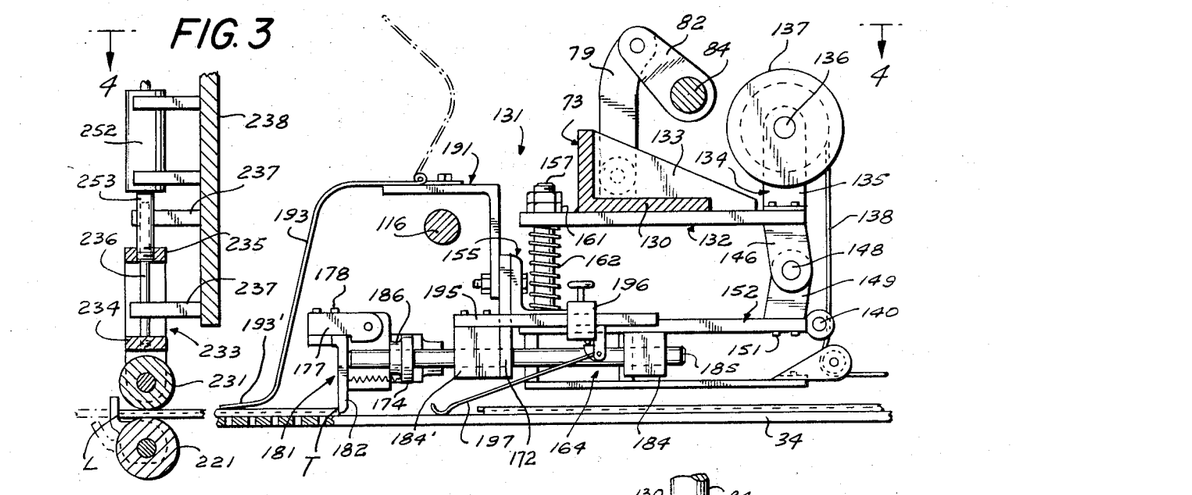
FIG. 3 is a side elevational view of the squaring unit, on a larger scale, and partly in section taken along line 3—3 of FIG. 1.
Figure 5:
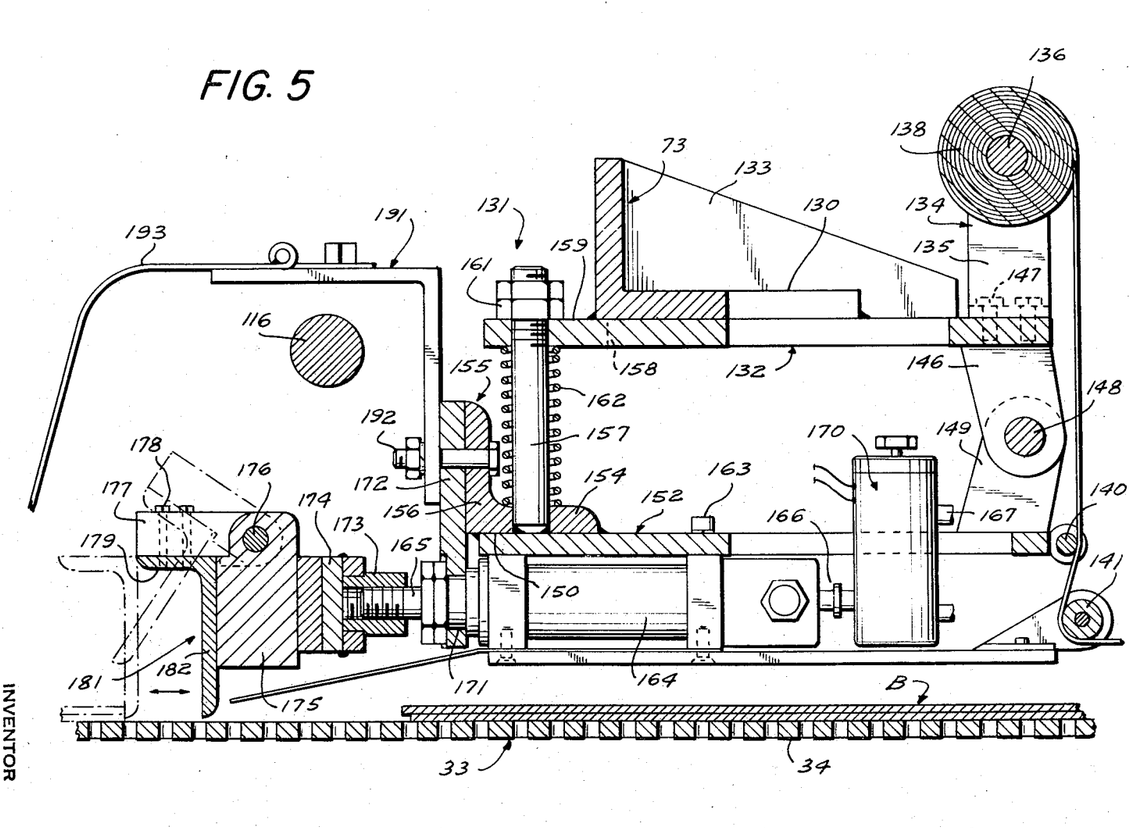
FIG. 5 is a view similar to FIG. 3 on an enlarged scale taken along line 5—5 of FIG. 4.
Figure 13:
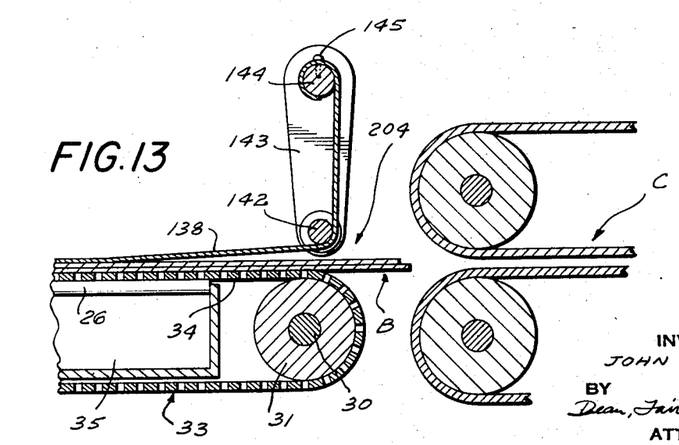
FIG. 13 is a detail sectional view taken along line 13—13 of FIG. 1 showing the inlet to the squaring equipment.

As is clearly shown in FIGS. 1, 3 and 5, the belt 138 rides over a bar 140 and around a roller 141, then extends rearwardly longitudinally of the conveyer belt 33, the belt 138 riding around a roller 142 (FIG. 13) carried by depending brackets 143 secured to a rod 144 extending transversely across the conveyer belt and mounted on L-beams 41, 111 and then is secured at its free end as at 145 to said rod.

The purpose of the belt 138 is to retain the flaps of the box blank B in closed position as the box blank B is advanced into the inlet 204 of the squaring equipment.

Depending from the end of the supporting plate 132 (FIG. 5) are spaced parallel bearing blocks 146 which are rigidly secured in place by bolts 147 which also retain the brackets 134 in fixed position on the supporting plate 132.

Extending through the free ends of the bearing blocks 146 is a shaft 148 which pivotally mounts one end of a pair of pivot arms 149, secured at their free ends as by screws 151 to the end of a plate 152 which is positioned beneath the supporting plate 132 so that the plate 152 is pivotally supported beneath the plate 132.

As shown in FIG. 5, there is secured as by welding to the edge 150 of plate 152 remote from bar 140, the horizontal leg 154 of an L-shaped beam 155, the vertical leg 156 of which extends the width of said plate 152.

Secured to the horizontal leg 154 of beam 155 and rising therefrom are a pair of spaced parallel studs 157, the free upper ends of which are threaded and extend through slots 158 in the front portion 159 of supporting plate 132 as is clearly shown in FIGS. 4 and 5.

The free ends of rods 157 protruding from the slots in plate 132 have nuts 161 secured thereto and a coil spring 162 encompasses each of the rods, being compressed between the undersurface of plate 132 and the horizontal leg 154 of L-bar 155. Thus, the plate 152 is normally pivoted downwardly on its pivot 148, the movement being limited by the abutment of nuts 161 against plate 132.

Secured to the undersurface of plate 152 centrally thereof as by screws 163 and extending longitudinally thereof is an air actuator 164 illustratively of the spring return type, the piston rod 165 of which is urged outwardly by the application of air under pressure through fitting 166 and air line 167 controlled by an electric valve 170.

The piston rod 165 extends through an opening 171 in a rectangular plate 172 (FIGS. 4, 5) secured to the vertical leg 156 of L-shaped bar 155 and is adjustably secured to a block 173 which in turn is secured to a rectangular plate 174 that has a pivot block 175 secured centrally thereto.

As is shown in FIGS. 4 and 5, a pivot pin 176 extends through the block 175 and through a pair of arms 177 which straddle the block 175 and which are secured as by screws 178 to the horizontal top leg 179 of an L-shaped pusher member 181. The pusher member 181 is normally urged so that its leg 182 is in vertical position against the pivot block 175 by springs 183.

In order to guide the pusher member, the plate 152 (FIGS. 3, 4) has a pair of guide blocks 184 secured to the undersurface thereof, through each of which extends a guide rod 185. Each of the rods 185 also extends through a block 184' secured to the front of plate 172 (FIG. 4) and through a bushing 186 carried by rectangular plate 174 and abuts at its free end against the vertical leg 182 of pusher member 181, the rods being locked in position in bushings 186 by set screws 187.

As is shown in FIGS. 3 and 5, an L-shaped bracket 191 is secured to plate 172 by bolts 192 which also secure plate 172 to L-bar 155 and the horizontal leg of the bracket 191 carries the end of a resilient presser strip 193, the free end 193' of which is designed to react against the folded box blanks B in the manner hereinafter to be described.

In order to control the timed operation of the equipment, one of the blocks 184' (FIGS. 3, 4) has secured thereto, an end of a bar 195 on which is slidably mounted a micro-switch 196 controlled by an actuating arm 197 which is engaged by the folded box blank as it is advanced. This micro-switch 196 controls the electric switch 170 which in turn controls the air actuator 164 that actuates the alignment bar 181.

The plate 174 mounts a cam member 198 which, when it is in retracted position as shown in FIG. 4, will retain the plunger 199 of a micro-switch 201 in retracted position and when the cam member is moved to the left with energization of the air actuator 164, will release the plunger 199. As is clearly shown in FIG. 4, the micro-switch is secured to an arm 202 that is mounted on the other block 184'.

The function of micro-switch 201 will be hereinafter described.

Figure 15:
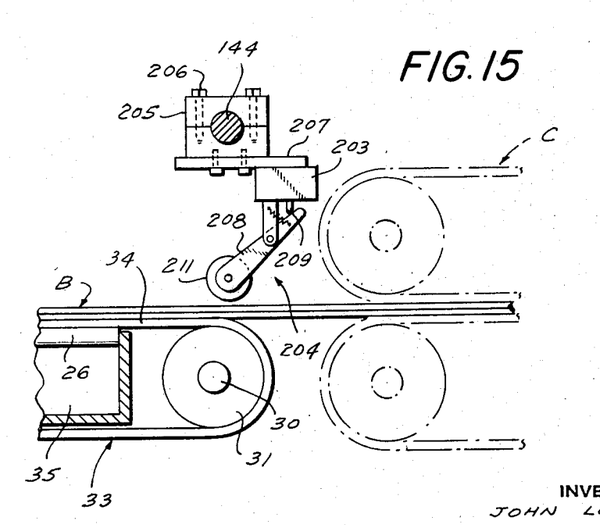
FIG. 15 is a detail view partly in cross section of the anti-jam micro-switch at the inlet to the squaring equipment.

In addition to the micro-switches 196 and 201, a third micro-switch 203 (FIG. 15) is also provided at the inlet 204 of the squaring equipment as shown in FIGS. 1 and 15.

To mount the micro-switch 203, as shown in FIGS. 1 and 15, a clamp 205 straddles the rod 144 and is secured thereto as by screws 206, the clamp being positioned between the conveyer belt 33 and guide 48.

An arm 207, secured at one end to clamp 205 has the micro-switch 203 secured to the other end thereof and depending therefrom.

The micro-switch carries a pivoted actuating arm 208, one end of which is spring urged against the plunger 209 of micro-switch 203 and the other end of which carries a roller 211.

The roller 211 is positioned adjacent the plane of the upper run 34 of conveyer belt 33 but spaced from such upper run by a distance greater than the thickness of a single folded box blank B. Thus, if more than one folded box blank at a time should be inadvertently fed into the squaring equipment, the roller 211 will be engaged to pivot actuating arm 208 so that plunger 209 will be released to stop further operation of the equipment thereby preventing jamming.

Associated with the pulley 32 at the outlet end of conveyer 33 is a rotatable stop mechanism which, in conjunction with the alignment member 181 produces the squaring action.

Figure 9:
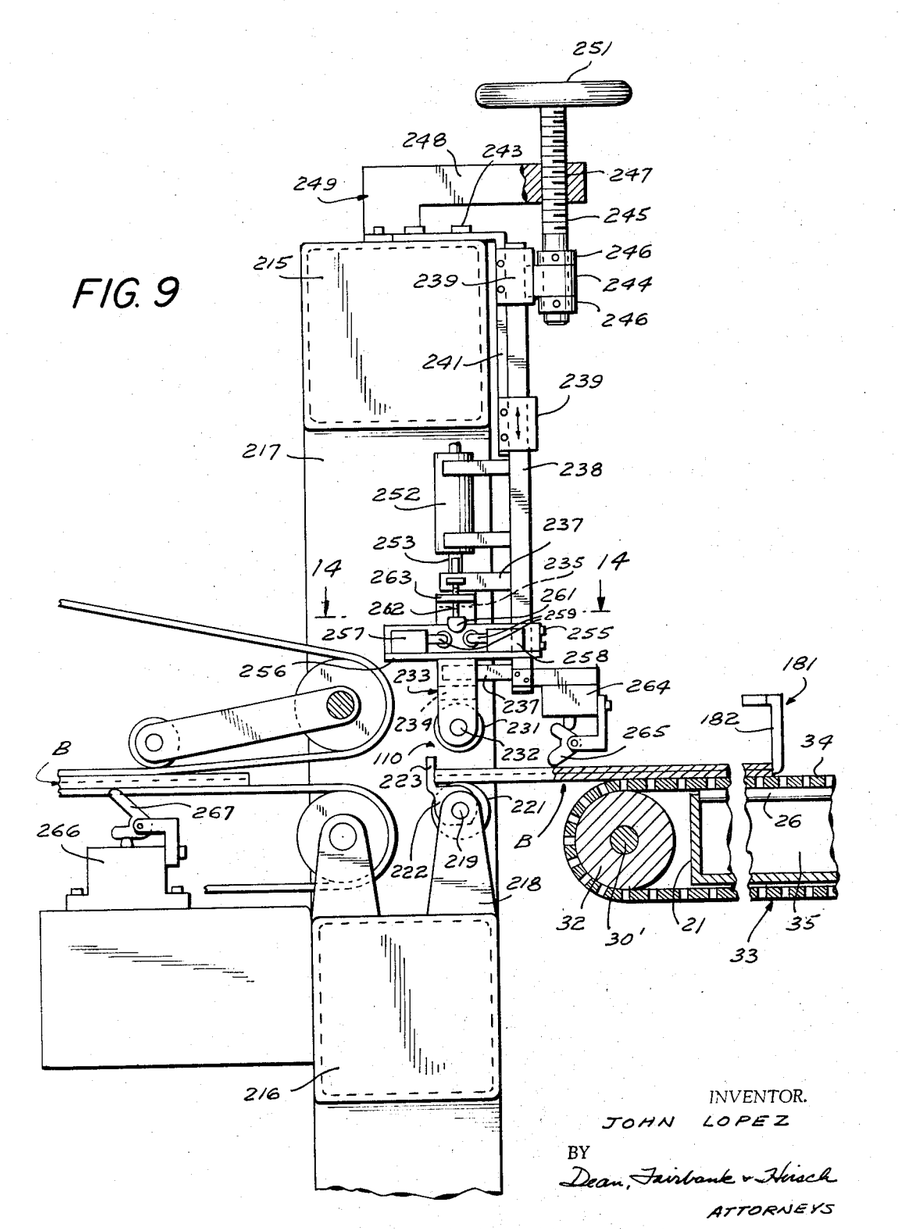
FIG. 9 is a side elevational view partly in cross section taken along line 9—9 of FIG. 1 and on an enlarged scale.
Figure 11:
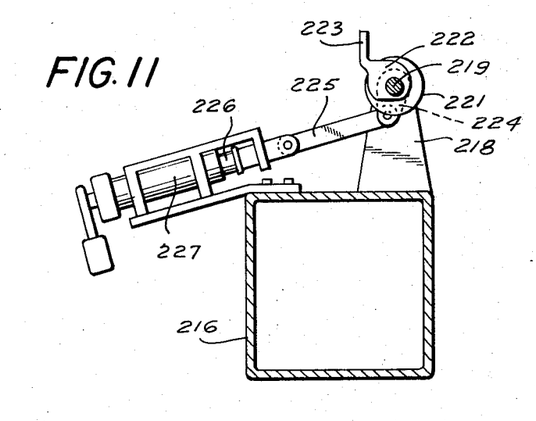
FIG. 11 is a detail sectional view taken along line 11—11 of FIG. 1 and on an enlarged scale showing the front alignment bar actuator.

As shown in FIGS. 1, 9 and 11, a pair of vertically spaced support beams 215, 216 extend outwardly from a vertical standard 217. Secured to the top surface of beam 216 are upstanding parallel brackets 218 which rotatably mount a shaft 219. Idly mounted on said shaft 219 is a roller 221 which is straddled by hubs 222 through which shaft 219 extends, said hubs being secured to said shaft. The hubs 222 form the legs of a yoke, the cross piece 223 of which comprises a stop or alignment bar which is normally aligned with the top run 34 of conveyer belt 33 as is shown in FIG. 9.

Mounted on the end of shaft 219 is one end of a lever 224, the free end of which is pivotally connected to one end of a link 225, the other end of which is pivotally connected to the end of the piston rod 226 of an air actuator 227 secured to beam 216.

The air actuator 227 is preferably of the spring return type and in the retracted position the alignment bar 223 will be in vertical position as shown and in the extended position the bar 223 will be rotated in a counterclockwise direction so that it is out of the path of movement of the box blank B.

As shown in FIGS. 1 and 9, there is associated with roller 221 and positioned above the latter, a vertically reciprocable roller 231 which is secured to a horizontal shaft 232 extending between the legs of a yoke 233.

A cross piece 234 is positioned beneath the cross piece 235 of the yoke and said cross piece 234 carries upright guide rods 236 which extend through suitable openings in blocks 237 extending laterally outward from vertical mounting plate 238 which supports the roller 231 and associated mechanism.

As is shown in FIGS. 1 and 9, the plate 238 which is rectangular, is slidably mounted between slotted side supports 239 secured to the depending legs 241 of L-brackets 242 which are secured by bolts 243 to the beam 215.

The plate 238 near its upper edge has an outwardly extending boss 244 with a vertical bore through which extends the end of an adjustment screw 245 which is freely rotatable in the bore. The screw has a pair of collars 246 secured thereto and straddling the boss 244 as is clearly shown in FIGS. 1 and 9.

The screw extends through a threaded opening 247 in the end of the horizontal arm 248 of an L-shaped bracket 249 secured to beam 215 and an adjustment wheel 251 is secured to the upper end of screw 245.

Thus, upon rotation of wheel 251, the plate can be moved up and down as desired.

The plate 238 also carries an air actuator 252, also illustratively of the spring return type, the plunger 253 of which is secured to the cross piece 235 of the yoke 233 to raise and lower the roller 231 when the air actuator 252 is energized.

As is shown in FIG. 1, a flexible shaft 254 is secured to the roller shaft 232 to rotate the latter, illustratively at a speed greater than the rate of advance of the conveyer belt 33.

Figure 14:
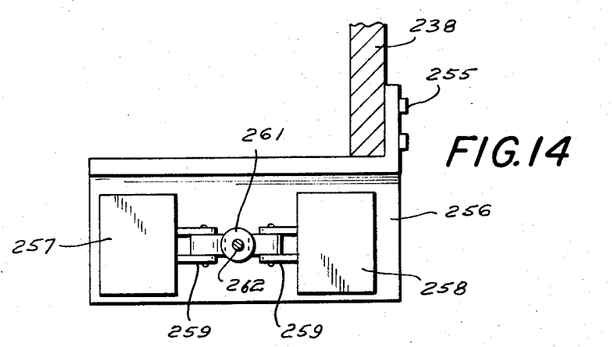
FIG. 14 is a detail sectional view taken along line 14—14 of FIG. 9.

Secured as by bolts 255 to the lower end of plate 238 at its side edge is a rearwardly extending support plate 256 extending in a horizontal plane as shown in FIGS. 9 and 14. The plate 256 carries a pair of micro-switches 257, 258, the plungers 259 of which are designed to be simultaneously actuated by the head 261 of a screw 262, threaded through a correspondingly threaded opening in the end of an arm 263 secured to the cross piece 235 of yoke 233 and extending outwardly therefrom.

Thus, the screw will move with the yoke 233 when the air actuator 252 is energized and the vertical position of the entire unit may be adjusted by rotation of handwheel 251.

The plate 238 also carries a micro-switch 264 (FIG. 9) the actuating arm 265 of which is designed to be engaged by the box blank and when the trailing edge of the box blank B passes actuating arm 265 the micro-switch 264 will energize the air actuator 227 (FIG. 11) to move the alignment member 223 back to vertical position.

The driven roller 231 is moved upwardly under control of a micro-switch 266 (FIGS. 1 and 9), the actuating arm 267 of which is designed to be engaged by the leading edge of the box blank B.

Figure 10:
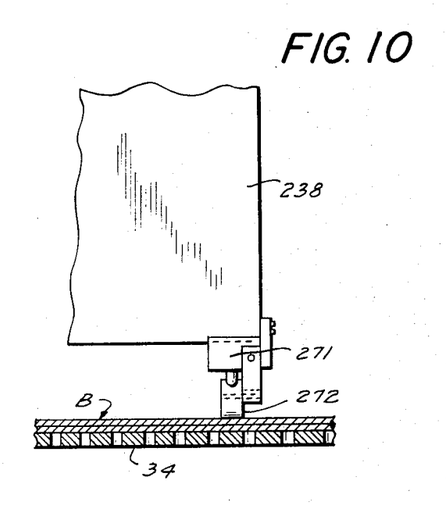
FIG. 10 is a fragmentary detail view of the anti-jam micro-switch carried by the driving roller mounting plate.

In addition, in order to prevent jam up if more than one box blank has reached the front alignment member 223, a micro-switch 271 (FIG. 10) is secured to the plate 238 at its lower end and has an actuating arm 272 adapted to be engaged by the plurality of box blanks to stop operation of the equipment.

*Operation*

In the operation of the equipment above described, folded box blanks B are to be advanced one by one by feed conveyer C (FIGS. 1, 13) between belt 138 and the upper run of suction conveyer belt 33.

As the top flaps F1, F2 (FIG. 2) may not be in alignment, as shown, the equipment is designed to square such flaps.

The equipment is first adjusted, depending upon the size of the box blank B to be squared.

Figure 16:
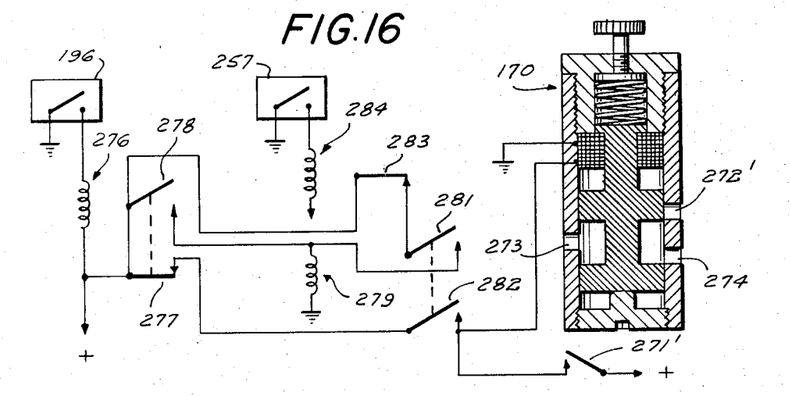
FIG. 16 is a diagrammatic view of the rear alignment member actuating circuit.

To this end, referring to the circuit diagrammatically shown in FIG. 16, the manual set up switch 271' is closed which will complete a circuit to the electric solenoid valve 170 which controls air actuator 164. The valve 170 may be of any conventional type which has an air inlet 272' connected to a source of air under pressure, an air outlet 273 connected to the inlet of air actuator 164 and a vent 274. The valve 170 is normally spring urged to connect the inlet of actuator 164 to vent 274 and when valve 170 is actuated it will cut off the vent and connect the source of air pressure to the air outlet 273.

Since the actuator 164 is normally spring urged to retract the alignment member 181, when switch 271' is closed, the air under pressure will be applied to the actuator to extend the alignment bar to its most forwardmost position.

Thereupon, the box blank B to be squared is positioned on the conveyer 33 with its leading edge L against the front alignment bar 223. With the detent 128 (FIG. 12) removed, the ratchet bar 118 is operated to move the carriage to the left (FIGS. 1 and 2) until the extended alignment member 181 abuts against the trailing edge T of the box blank. The carriage is moved sufficiently to the left so that the box blank preferably is slightly bowed to make sure that proper squaring thereof will occur.

When the carriage is thus set, the detent 128 is positioned to lock the carriage in set position. Due to the spring urged reel, the belt 138 will play off the reel with such movement of the carriage.

Figure 17:
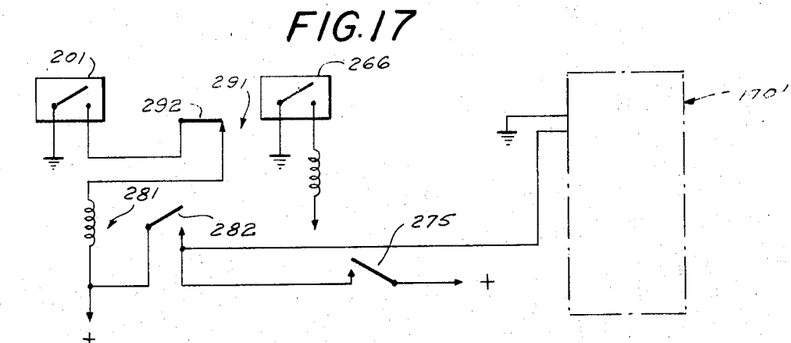
FIG. 17 is a view similar to FIG. 16 of the driving roller actuating circuit.

At this time also, referring to FIGS. 9 and 17, the manual setup switch 275 is closed which will complete a circuit to the electric solenoid valve 170' controlling air actuator 252. Since the actuator 252 is normally spring urged to lift the driven roller 231, when switch 275 is closed the air under pressure will be applied to the actuator to move the roller 231 downwardly against the folded box blank.

If the roller 221 is not pressing firmly against the box blank, the hand wheel 251 is rotated to move the plate 238 and the air actuator thereon downwardly until the roller is properly set.

The screw 262 controlling the micro-switch 257, 258 is then adjusted so that said micro-switches will be actuated when the roller 231 is pressing against the box blank.

At this time the switches 271' and 275 are opened to break the circuit therethrough to the electric valves 170, 170' for the air actuators 164 and 252 and the side gauges 48, 52 are adjusted to accommodate the width of the box to be squared.

The blower 36, the drive for conveyer 33 (not shown) and the conveyer C are then energized and the folded box blanks B will be fed one by one into the inlet 204 of the squaring equipment with the gap G between the flaps F1, F2 longitudinally aligned with the path of movement of the conveyer 33.

As the blank B enters the inlet between the conveyer belt 33 and the belt 138, the latter will prevent the flaps F1, F2 from opening and the suction applied through the perforations in belt 33 will firmly retain the blank B against the belt and advance such blank.

If for some reason more than one blank at a time was fed by the conveyer C, into the inlet 204 of the squaring equipment, referring to FIG. 15, due to the excessive height of the plurality of blanks, they will not pass freely under roller 211 which is set at a height to permit only one blank to pass thereunder, and micro-switch 203 will be actuated to cut off power to the equipment.

Assuming that only one blank B has been fed by conveyor C, such blank will be advanced by the suction conveyer belt. As the leading edge L of the blank passes the free end of actuator arm 197 of micro-switch 196 (FIGS. 3 and 16) it will actuate such micro-switch to close the contacts thereof.

Referring to FIG. 16, closing of micro-switch 196 will complete a circuit to the coil of relay 276 thereby first opening contacts 277 thereof and then closing contacts 278. When contacts 278 close, a circuit will be completed through the coil of relay 279 thereby closing the contacts 281, 282 of said relay. However, since contacts 277 controlled by relay 276 previously opened, there will be no circuit to the electric solenoid 170 controlling air actuator 164 for the alignment member 181. Due to the closing of contacts 281 of relay 279 a holding circuit will be provided for said relay 279 through the normally closed contacts 283 of release relay 284 which is controlled by micro-switch 257.

With continued forward movement of the box blank, its leading edge L will strike against the rear of the alignment member 181 and as it is pivoted, it will move clear of the box blank so that the latter is free to pass thereunder.

The leading edge L will then engage the actuator arm 265 of micro-switch 264 (FIGS. 9 and 18) to close its contacts. However, as micro-switch 258 in series therewith has not been actuated, this will have no effect.

With further continued movement of the box blank, its leading edge L will abut against the alignment member 223 as shown in FIG. 9.

If for some reason more than one blank at a time should abut against alignment member 223, due to the excessive height of the plurality of blanks, they will not pass freely under actuating arm 272 of micro-switch 271 (FIG. 10), which is set at a height to permit only one blank at a time to pass thereunder and micro-switch 271 will be actuated to cut off power to the equipment.

Assuming that only one blank B has been fed to the alignment member 223, when the trailing edge T of the box blank moved past the actuating arm 197 of micro-switch 196, the latter will open. Referring to FIG. 16 when this occurs, contacts 278 of relay 276 will open and contacts 277 will close. As a holding circuit has been provided for relay 279 due to closed contacts 281 thereof, the contacts 282 will also be closed and since contacts 277 of now deenergized relay 276 will also be closed, a circuit will be provided to energize electric solenoid valve 170 controlling air actuator 164 and the plunger 165 thereof will move forwardly against its return spring. As a result, the alignment member 181 will move forwardly against the trailing edge of the box blank which has moved in front of the alignment member by this time.

As a result of the force exerted by the alignment member 181 against the trailing edge T of the box blank B, the front edges of the top flaps F1, F2 will be moved against the front alignment member 223 and hence the top flaps F1, F2 will be moved backwardly slightly thereby squaring the flaps.

At this time, due to the forward movement of plunger 165 of air actuator 164, the cam 198 (FIG. 4) carried thereby will move past the plunger 199 of micro-switch 201 permitting closure of the contacts thereof. Referring to FIG. 17 when this occurs, a circuit will be completed through the coil of relay 281 closing its contacts 282 so that the electric solenoid valve 170' controlling air actuator 252 will be energized causing the plunger 253 thereof and the yoke and driven roller 231 carried thereby to move downwardly against the squared box blank held against front alignment member 223 by rear alignment member 181.

When the driven roller 221 engages the top flaps F1, F2, it will retain such flaps in squared position and tend to urge the box blank forwardly. At this time, due to downward movement of yoke 235 and screw 212 carried thereby, both micro-switches 257, 258 will be actuated.

Figure 18:
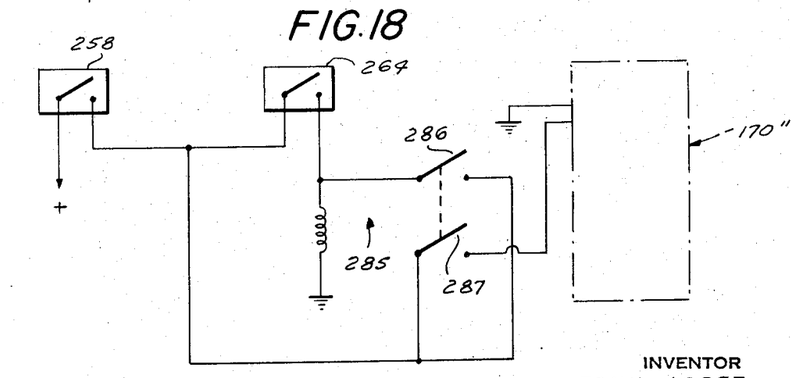
FIG. 18 is a view similar to FIG. 16 of the front alignment member actuating circuit.

When micro-switch 258 is actuated, referring to FIG. 18, it will complete a circuit from ground through closed micro-switch 264 to relay 285 to close its contacts 286, 287. Contacts 286 provide a holding circuit for relay 285 and contacts 287 complete a circuit to the electric valve 170" controlling air actuator 227 so that the front alignment member 223 will be pivoted out of the path of movement of the box blank.

As a result, the driven roller 231 will rapidly advance the squared folded box blank between the conveyer belts C' of the subsequent processing equipment which may be a taping machine of conventional type such as that put out by Universal Corrugated Box Machinery Corporation and this machine will thereupon apply tape to the juxtaposed edges of the squared folded box blank, the flaps being maintained square, even after release of the front alignment member by reason of the clamping action of rollers 231 and 221.

When micro-switch 257 is actuated by downward movement of yoke 235, referring to FIG. 16, closing of the contacts of micro-switch 257 will cause relay 284 to be energized to open its contacts 283 thereby breaking the holding circuit for relay 279 to cause its contacts 281, 282 to open. Opening of contacts 282 will break the circuit to the electric solenoid valve 170 controlling air actuator 164, and it will be spring returned to its retracted position.

Prior to the full return of the rear alignment member 181, due to the release of the squared box blank by movement of the front alignment member 223, the leading edge of the box blank, after the latter is gripped in conveyer C, will abut against the actuating arm of micro-switch 266. As a result, relay 291 (FIG. 17) will be energized to open contacts 292 thereby breaking the circuit to relay 281 so that its contacts 282 will open to de-energize the electric valve 170' controlling air actuator 252. As a result, the driven roller will be spring returned upwardly to release the box blank which is now being transported by conveyer C'.

Due to the fact that the rear alignment member 181 has been retracted, micro-switch 201 will again be opened due to cam 198 so that even when the trailing edge of the box passes the actuating arm of micro-switch 266 to permit closing of contacts 292 (FIG. 17), the circuit to air actuator 252 will remain broken so that the driven roller will be in its uppermost position.

With the equipment above described, box blanks can be squared at a high rate of speed and with assurance that no jamming can occur.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for squaring the panels of a folded box blank comprising a conveyor belt having a horizontal run to carry such box blank with the gap between the folded top flaps thereof extending longitudinally of the conveyor belt, means to advance said conveyor belt, an alignment member in the path of movement of such box blank carried by said conveyor belt, and against which the leading edge of the box plank is adapted to abut with the gap between such folded top panels extending at right angles to said alignment member, to restrain movement of such box blank, means mounting said alignment member for movement thereof out of the path of said box blank to release the latter after the panels thereof have been squared, a pusher member movable against the trailing edge of such box blank as it is advanced by said conveyor belt to force the leading edge thereof against the alignment member thereby squaring the panels of such box blank, said alignment member comprising an elongated strip extending transversely with respect to said conveyor belt, a roller associated with said strip, a shaft extending transversely with respect to said conveyor belt and idly mounting said (first) roller, said elongated strip extending parallel to said (first) roller and having its ends secured to said shaft, a lever secured to said shaft to rotate the latter, means to actuate said lever to effect movement of said strip out of the path of movement of said box blank, and a second roller normally spaced from said first roller and movable toward the latter to clamp the box blank therebetween after the latter has been squared to retain the box blank in such squared condition.

2. Equipment for squaring the panels of a folded box blank comprising a conveyer belt having a horizontal run to carry such box blank with the gap between the folded top flaps thereof extending longitudinally of the conveyer belt, said conveyer belt having an inlet and discharge end, means to advance said conveyer belt, an alignment member in the path of movement of such box blank carried by said conveyer belt, and against which the leading edge of the box blank is adapted to abut with the gap between such folded top panels extending at right angles to said alignment member, to restrain movement of such box blank, means mounting said alignment member for movement thereof out of the path of said box blank to release the latter after the panels thereof have been squared, a carriage extending transversely across said conveyer belt, means to effect movement of said carriage longitudinally of said conveyer belt between said inlet and discharge ends, and a pusher member movable against the trailing edge of such box blank as it is advanced by said conveyer belt to force the leading edge thereof against the alignment member thereby squaring the panels of such box blank, said pusher member comprising an elongated strip positioned over the horizontal run of said conveyer belt and extending transversely thereof, an actuator mounted on said carriage, said actuator having a piston rod connected to said pusher strip to effect movement of the latter.

3. The combination set forth in claim 2 in which said pusher strip is pivotally mounted with respect to said piston rod, and means normally to retain said pusher strip in vertical position, said pusher strip being pivoted by the abutment of the leading edge of the box blank against the rear of the pusher strip.

4. Equipment for squaring the panels of a folded box blank comprising a conveyer belt having a horizontal run to carry such box blank with the gap between the folded top flaps thereof extending longitudinally of the conveyer belt, means to advance said conveyer belt, an alignment member in the path of movement of such box blank carried by said conveyer belt, and against which the leading edge of the box blank is adapted to abut with the gap between such folded top panels extending at right angles to said alignment member, to restrain movement of such box blank, means mounting said alignment member for movement thereof out of the path of said box blank to release the latter after the panels thereof have been squared, a rigid beam extending transversely across said conveyer belt, means mounting said beam for movement thereof longitudinally of said conveyer belt, a support plate pivotally mounted at one edge between said beam and said conveyer belt on a horizontal axis extending transversely with respect to the conveyer belt, said axis being supported by said beam, a stud secured at one end with respect to said plate at the opposed edge thereof and rising therefrom, a rigid member carried by said beam having an aperture to receive said stud, stop means at the free end of said stud, a compression spring encompassing said stud between said plate and said rigid member normally urging said opposed edge downwardly, an actuator carried by said plate, said actuator having a piston rod, and a pusher member movable against the trailing edge of such box blank as it is advanced by said conveyer belt to force the leading edge thereof against the alignment member thereby squaring the panels of such box blank, said pusher member comprising an elongated strip positioned over the horizontal run of said conveyer belt and extending transversely thereof, said strip being operatively connected to the free end of said piston rod.

5. The combination set forth in claim 4 in which a pair of spaced parallel racks are provided straddling said conveyer belt and extending parallel thereto, a plate positioned at each end of said rigid beam, each of said plates having a pinion riding on the associated rack, means carried by said plates to mount said beam for vertical movement with respect thereto, means to rotate said pinions to effect longitudinal movement of said beam, and means to effect vertical movement of said beam with respect to said plates.

6. The combination set forth in claim 5 in which a shaft extends transversely across said conveyer belts, through said plates, said pinions being secured to said shaft and a reversible ratchet mechanism is secured to said shaft to effect rotation thereof in either direction.

7. The combination set forth in claim 5 in which a shaft extends transversely across said conveyer belt through said plates, linkage is provided between said shaft and said beam and a lever is connected to said shaft to effect rotary movement thereof to raise and lower said beam, means being provided to retain said beam in raised position and means being provided to limit the lowermost position of said beam.

8. Equipment for squaring the panels of a folded box blank comprising a conveyer belt havng a horizontal run to carry such box blank with a gap between the folded top flaps thereof extending longitudinally of the conveyer belt, means to advance said conveyer belt, an alignment member in the path of movement of such box blank carried by said conveyer belt and against which the leading edge of the box blank is adapted to abut with the gap between such folded top panels extending at right angles to said alignment member to restrain such box blank, said alignment member comprising an elongated strip extending transversely with respect to said conveyer belt, a roller associated with said strip, a second roller normally spaced from said first roller and movable toward the latter to clamp the box blank therebetween after the latter has been squared to retain the box blank in such squared condition, means mounting said alignment member for movement thereof out of the path of such box blank to release the latter after the panels thereof have been squared, a pusher member movable against the trailing edge of such box blank as it is advanced by said conveyer belt to force the leading edge thereof against the alignment member thereby squaring the panels of such box blank, means to drive one of said rollers, means controlled by the movement of said pusher member against the trailing edge of such box blank to effect downward movement of said second roller to clamp the box blank between said two rollers, and means controlled by such downward movement of said second roller to effect movement of the alignment member out of the path of movement of the box blank whereby said driven roller will discharge the box blank clamped between said two rollers.

9. The combination set forth in claim 8 in which means are provided to effect retraction of said pusher member after the leading edge of said box blank has been released by the movement of the alignment member out of the path of such box blank.

10. The combination set forth in claim 8 in which means are provided to stop movement of said conveyer belt in the event more than a predetermined number of box blanks has been advanced thereon.

11. The combination set forth in claim 8 in which means are provided to stop movement of said conveyer belt in the event more than a predetermined number of box blanks has abutted against said alignment member.

12. The combination set forth in claim 8 in which a carriage extends transversely across said conveyer belt, means to effect movement of said carriage longitudinally of said conveyer belt, between said inlet and discharge ends, said pusher member comprises an elongated strip positioned over the horizontal run of said conveyer belt and extending transversely thereof, an actuator mounted on said carriage, said actuator having a piston rod connected to said pusher strip to effect movement of the latter, an elongated belt is provided having one end secured to the inlet end of said squaring equipment and the other end carried by said carriage, said belt having a portion thereof between said inlet end and said carriage extending substantially parallel to and adjacent the upper run of said conveyer belt and means are provided to feed and to take up said belt as the carriage is moved longitudinally away from and toward said inlet end.

13. The combination set forth in claim 12 in which said feeder and take-up means comprises a resilient take-up reel carried by said carriage, said belt being wound on said take-up reel.

References Cited
UNITED STATES PATENTS

| | | | |
|---|---|---|---|
| 2,915,950 | 12/1959 | LaBombard | 93—365 |
| 3,038,391 | 6/1962 | VonHofe et al. | 93—54 |

BERNARD STICKNEY, *Primary Examiner.*